United States Patent
Kabra et al.

(10) Patent No.: US 11,687,491 B2
(45) Date of Patent: Jun. 27, 2023

(54) GENERATING WEIGHTS FOR FINDING DUPLICATE RECORDS

(71) Applicant: International Business Machines Corporation, Armonk, NY (US)

(72) Inventors: Namit Kabra, Hyderabad (IN); Manish A. Bhide, Hyderabad (IN)

(73) Assignee: INTERNATIONAL BUSINESS MACHINES CORPORATION, ARMONK, NY, Armonk, NY (US)

( * ) Notice: Subject to any disclaimer, the term of this patent is extended or adjusted under 35 U.S.C. 154(b) by 886 days.

(21) Appl. No.: 16/037,444

(22) Filed: Jul. 17, 2018

(65) Prior Publication Data

US 2020/0026782 A1 Jan. 23, 2020

(51) Int. Cl.
| | |
|---|---|
| G06F 16/17 | (2019.01) |
| G06F 16/174 | (2019.01) |
| G06F 17/10 | (2006.01) |
| G06F 16/903 | (2019.01) |
| G06F 18/2411 | (2023.01) |

(52) U.S. Cl.
CPC .... *G06F 16/1748* (2019.01); *G06F 16/90335* (2019.01); *G06F 17/10* (2013.01); *G06F 18/2411* (2023.01)

(58) Field of Classification Search
None
See application file for complete search history.

(56) References Cited

U.S. PATENT DOCUMENTS

| | | | |
|---|---|---|---|
| 2003/0041059 A1* | 2/2003 | Lepien | G06F 16/24556 |
| 2014/0006423 A1* | 1/2014 | Melnychenko | G06F 16/24578 |
| | | | 707/749 |
| 2014/0244300 A1* | 8/2014 | Bess | G06F 16/22 |
| | | | 705/3 |
| 2016/0162507 A1 | 6/2016 | Gupta et al. | |
| 2016/0357790 A1* | 12/2016 | Elkington | G06N 3/0454 |
| 2017/0161326 A1 | 6/2017 | Anderson | |
| 2019/0303371 A1* | 10/2019 | Rowe | G06F 16/215 |

\* cited by examiner

*Primary Examiner* — Syling Yen
(74) *Attorney, Agent, or Firm* — Cuenot, Forsythe & Kim, LLC (57) ABSTRACT

Data-deduplicating includes comparing a first record of a data-store with a second record of the data-store but instead of using a static weight for a field, the present data-deduplicating dynamically assigns a first weight for the first score to generate a first weighted score, wherein the first weight is based on one or both of the first value or the second value; and assigns a second weight for the second score to generate a second weighted score. A composite score is calculated based on the first weighted score and the second weighted score; and it is determined whether or not the first record and the second record are duplicate records, based on the composite score.

20 Claims, 5 Drawing Sheets

| 102 | 104 | 106 | 108 | 110 | 112 | 114 | 116 | 118 | |
|---|---|---|---|---|---|---|---|---|---|
| COLUMN | FIRST NAME | LAST NAME | MIDDLE NAME | SUB AREA | AREA | CITY | TOTAL (E.G. SUM) | CLASSIFY | |
| 1A | Mohammaed | Khan | Rustam | Ward 123 | Saket | New Dehli | | | |
| 1B | Mohammed | Khan | Ali | Ward 123 | Saket | New Dehli | | | |
| | 5 | 5 | -20 | 10 | 5 | 5 | 10 | UNIQUE | 120 |
| | | | | | | | | | |
| 2A | Lalita | Patel | Ben | Ward 123 | Saket | New Dehli | | | |
| 2B | Lalita | Patel | Bai | Ward 123 | Saket | New Dehli | | | |
| | 5 | 5 | -3 | 10 | 5 | 5 | 27 | MATCH | 122 |
| | | | | | | | | | |

| 102 | 104 | 106 | 108 | 110 | 112 | 114 | 116 | 118 | |
|---|---|---|---|---|---|---|---|---|---|
| COLUMN | FIRST NAME | LAST NAME | MIDDLE NAME | SUB AREA | AREA | CITY | TOTAL (E.G. SUM) | CLASSIFY | |
| 1A | Mohammaed | Khan | Rustam | Ward 123 | Saket | New Dehli | | | |
| 1B | Mohammed | Khan | Ali | Ward 123 | Saket | New Dehli | | | |
| | 5 | 5 | -20 | 10 | 5 | 5 | 10 | UNIQUE | 120 |
| | | | | | | | | | |
| 2A | Lalita | Patel | Ben | Ward 123 | Saket | New Dehli | | | |
| 2B | Lalita | Patel | Bai | Ward 123 | Saket | New Dehli | | | |
| | 5 | 5 | -3 | 10 | 5 | 5 | 27 | MATCH | 122 |
| | | | | | | | | | |

GENERATING WEIGHTS FOR FINDING DUPLICATE RECORDS

BACKGROUND

The present invention relates to analysis of electronic records, and more specifically, to identifying duplicate records.

With the increased usage of electronic record keeping, it may be useful in some instances to merge different databases or collect data from many different sources or at different times. Thus, there can be duplicate records in a database. For example, in a database in which each respective record identifies one of a multitude of people, a duplicate record would be present if two records pertained to the same person. In many instances, each database record comprises a plurality of different fields and a variety of approaches have been developed to use probabilistic matching to automatically detect duplicate records using a computers and other processing devices.

SUMMARY

A method for data-deduplicating includes comparing a first record of a data-store with a second record of the data-store, wherein comparing involves a) comparing a first value of a first field of the first record with a second value of a second field of the second record and determining a first score indicative of whether or not the first value matches the second value; and b) comparing a third value of a third field of the first record with a fourth value of a fourth field of the second record and determining a second score indicative of whether or not the third value matches the fourth value. Instead of a static weight for a field, the present data-deduplicating dynamically assigns a first weight for the first score to generate a first weighted score, wherein the first weight is based on one or both of the first value or the second value; and assigns a second weight for the second score to generate a second weighted score. A composite score is calculated based on the first weighted score and the second weighted score; and it is determined whether or not the first record and the second record are duplicate records, based on the composite score.

A system that includes a processor programmed to initiate executable operations. In particular, the operations include comparing a first record of a data-store with a second record of the data-store, wherein comparing involves a) comparing a first value of a first field of the first record with a second value of a second field of the second record and determining a first score indicative of whether or not the first value matches the second value; and b) comparing a third value of a third field of the first record with a fourth value of a fourth field of the second record and determining a second score indicative of whether or not the third value matches the fourth value. Instead of a static weight for a field, the present data-deduplicating dynamically assigns a first weight for the first score to generate a first weighted score, wherein the first weight is based on one or both of the first value or the second value; and assigns a second weight for the second score to generate a second weighted score. A composite score is calculated based on the first weighted score and the second weighted score; and it is determined whether or not the first record and the second record are duplicate records, based on the composite score.

A computer program product includes a computer readable storage medium having program code stored thereon. In particular, the program code is executable by a data processing system to initiate operations including: comparing a first record of a data-store with a second record of the data-store, wherein comparing involves a) comparing a first value of a first field of the first record with a second value of a second field of the second record and determining a first score indicative of whether or not the first value matches the second value; and b) comparing a third value of a third field of the first record with a fourth value of a fourth field of the second record and determining a second score indicative of whether or not the third value matches the fourth value. Instead of a static weight for a field, the present data-deduplicating dynamically assigns a first weight for the first score to generate a first weighted score, wherein the first weight is based on one or both of the first value or the second value; and assigns a second weight for the second score to generate a second weighted score. A composite score is calculated based on the first weighted score and the second weighted score; and it is determined whether or not the first record and the second record are duplicate records, based on the composite score.

DETAILED DESCRIPTION

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being).

The term "data-deduplication" refers to identifying, and possibly eliminating, duplicate records in a database or multiple databases. A database, as used herein, can include ay of a variety of known database types (e.g., flat-file, relational, object-oriented, etc.), as well as less-formally structured collections of records.

Automated data-deduplication typically uses probabilistic matching to identify duplicate records in one or more databases. Each of the records likely comprises multiple fields, or columns, such that a probabilistic matching algorithm compares similar fields from the two records to see if the contents of the fields match. The determination for a match is repeated for a number of different fields that are likely in both records. A score of whether or not the two records are duplicates can then be calculated based on some combination of the individual results from comparing the different fields. In particular, during training of an artificial intelligence classifier system, certain fields can be determined to be more critical to correctly determining which records are duplicates. Thus, a respective weight can be assigned to each of the fields or columns to have a match for one field be treated a more or less important than another field when calculating the overall match-score for two records.

In typical probabilistic approaches to data-deduplication, the weight for a given field, or column, is determined based on training sets of data and then remain static when applied to deduplicate data operationally. Embodiments in accordance with the present disclosure dynamic weights for a single filed, or column, can be applied. In particular, for a participating column, or field, the weight can be made different based on the content, or value, of that field. As a result, embodiments in accordance with the present disclosure, as compared with conventional approaches, can lessen the number of duplicate records that are mis-identified as being unique and also lessen the number of unique records that are mis-identified as being duplicate. Accordingly, in accordance with the present disclosure, databases or data stores can be reduced in size by identifying and eliminating duplicate records but also improve data integrity by retaining those records that are unique.

Additionally, data de-duplication can involve a data steward (i.e., a person) to which "difficult" comparisons are presented for final decision making. The data-deduplication algorithm can classify records into predetermined categories such as "duplicate", "unique" and "clerical". If a match-value, or match-score, for a record is below a first threshold value, for example, then the record can be categorized as unique. If that match-value, however, is above some second threshold, then that record can be classified as a duplicate. Any record with a match-score or match-value between those two thresholds can be classified as "clerical" and presented to a data steward. Thus, the number of clerical records may be considered as dependent on the accuracy and robustness of the data-deduplication algorithm and clerical evaluation is a major contributor to increased costs in finding duplicate records in a database. Embodiments in accordance with the present disclosure provide the technical benefit of improving the data-deduplication algorithm to reduce the number of clerical records identified and, thereby, reduce the efforts required of data stewards.

Figure 1:
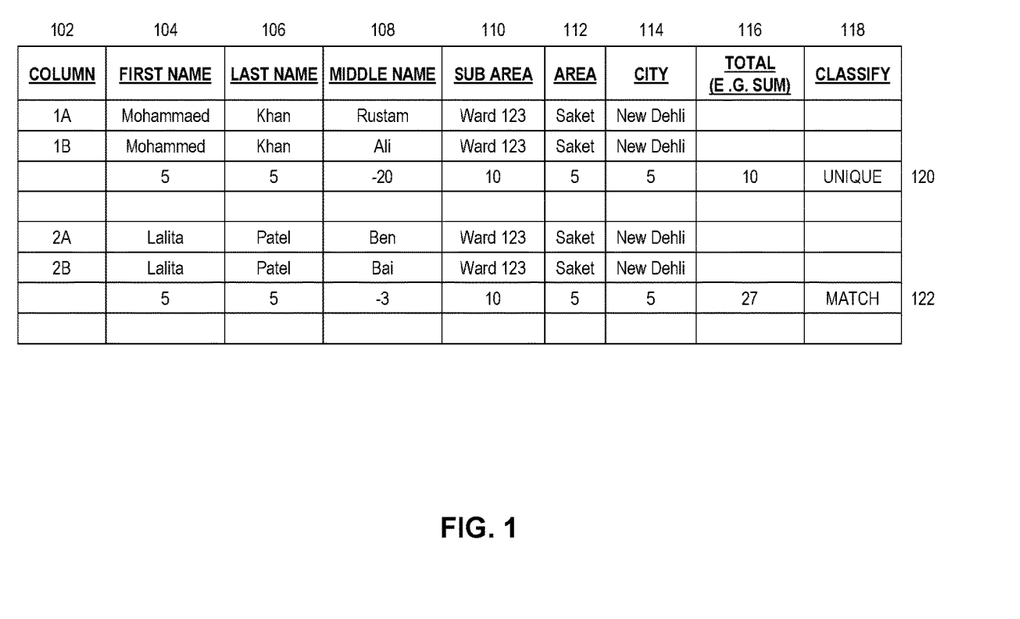
FIG. 1 is an example of records that may be part of one or more databases and may need a data steward to properly classify them in accordance with the principles of the present disclosure.

FIG. 1 is an example of records that may be part of one or more databases and may need a data steward to properly classify them. Each record includes a column 102 identifying that record and is comprised of multiple columns 104-118 that have content that relates to identifying characteristics of a person. The subject matter of the table of FIG. 1 is merely illustrative in nature. Embodiments of the present disclosure may be applied to other knowledge domains as well in which the fields or columns relate to different content than that of FIG. 1. Additionally, as explained more fully below, the weights and considered to contribute to the uniqueness of particular columns can be different than those identified when describing the example of FIG. 1.

The rows 120 and 122 show the scores of the individual columns and their contribution to the overall score in column 118. For column 104, the "first name" score in row 120 is a "5". Thus, this can be considered a match (e.g., the score is positive) and this particular field has a weight of "5". In comparison, a match in column 110, "Sub Area", is weighted as a "10". If the contents of the records in a column do not match, then the score for that column is a negative value of the weight for that column (e.g., "−5") Based on the overall score being calculated as the sum of the individual column scores, a higher number indicates more columns matched. The overall score can be compared to some threshold to determine whether or not the records are duplicates.

When a subject matter expert, e.g., a data steward, is presented with records 1A and 1B, that expert will identify that the two records likely refer to different individuals based on the dissimilar middle names. Similarly, a subject matter expert may notice the relatively similar middle names of records 2A and 2B and conclude that the records likely refer to the same individual and, thus, are duplicates. One way to train the system to correctly identify records 1A and 1B as unique would be to make the weight for that column equal to a relatively high number such as "20". Thus, when this column does not match for two records, the individual score of −20 will result in a low overall score and, thereby indicate the records are unique. However, such a static application of a weight of "20" to column 110 would result in records 2A and 2B also being classified as unique. In accordance with the principles of the present disclosure, a way is described for dynamically applying a weight to a particular column based on the record's actual data contents record in in that column. In the example of FIG. 1, A weight of "3" is applied so that even though the individual score for column 110 is a negative number (e.g., −3), the overall score in column 118 remains high enough to be considered indicative of duplicate records.

Figure 2A:
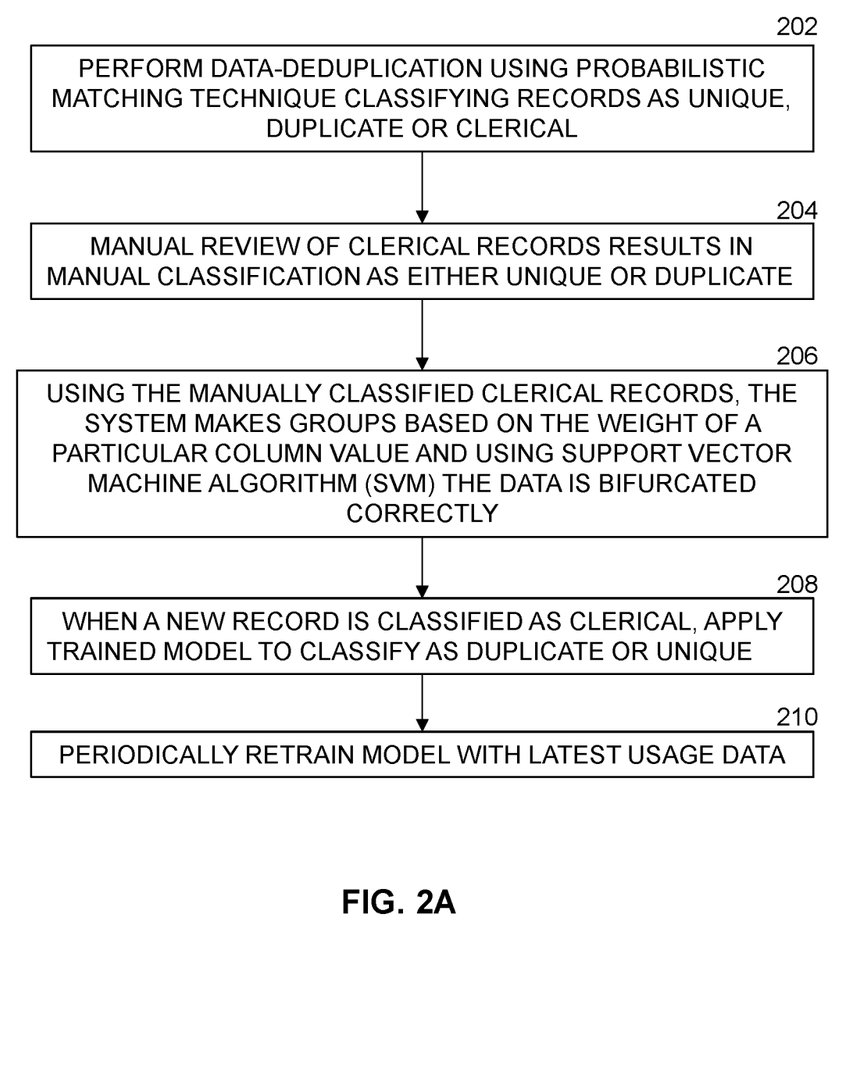
FIG. 2A is a flowchart of an example algorithm for implementing a system or method in accordance with the principles of the present disclosure.

FIG. 2A is a flowchart of an example algorithm for implementing a system or method in accordance with the principles of the present disclosure. The process beings in step 202 with a user performing data-deduplication using a probabilistic matching technique, as described above, which results in the records of a database or data-store being classified into different categories. The example categories can be "duplicate", "unique", and "clerical". Conventional methods of training and using such a matching algorithm of this sort can be utilized.

In step 204, a subject matter expert, can review the records classified as clerical and manually classify them as duplicate or unique records. This manual classification is used to further train the matching algorithm to determine a dynamic weight, rather than a static weight, for a particular column. Thus, in step 206, the system, or algorithm, makes groups based on the weight of a particular content or value in a column or field. One technique may be to use a Support Vector Machine Algorithm (SVM) to bifurcate the data correctly. In machine learning, support vector machines (SVMs) are supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier. An SVM model is a representation of the examples as points in space, mapped so that the examples of the separate categories are divided by a clear gap that is as wide as possible. New examples are then mapped into that same space and predicted to belong to a category based on which side of the gap they fall.

In the present example, for a particular record a weight for a given value in a column (e.g., the name "Rustam" in the column 110 "Middle Name") is assigned a dynamic weight which results in the particular record being classified in agreement with how the subject matter expert classified that particular record. An example result of performing the SVM algorithm with middle names (for example) might result in the clustering shown in FIG. 3. Those names on the right of the separating line are assigned a relatively high weight (i.e., their presence was typical for clerical records that were classified as unique.) Those names on the left of the separating line are assigned a relatively low weight (i.e., their presence was typical for clerical records that were classified as duplicates). The respective high weight and low weight could be the same for each member of the two groups (e.g., "20" for high and "3" for low). Alternatively, each name could be assigned its own respective weight based on the results of the SVM algorithm.

In step 208, the system can encounter a new clerical record and, based on the trained model, determine a dynamic weight for the Middle Name value that is the content of that record (e.g., "Bai"). Optionally, in step 210, the system can periodically be re-trained at regular intervals based on the most-recent usage data.

In the above example, only a single column was assigned dynamic weights. One of ordinary skill will recognize, that example records can include multiple fields or columns and that dynamic weight can be applied to each of the separate columns. Furthermore, such dynamic weighting can be independently determined such that a record which has a high weight applied to the "Middle Name" column because of the middle name in the record could have a low weight applied to the "Last Name" column because of the last name in the record.

Figure 3:
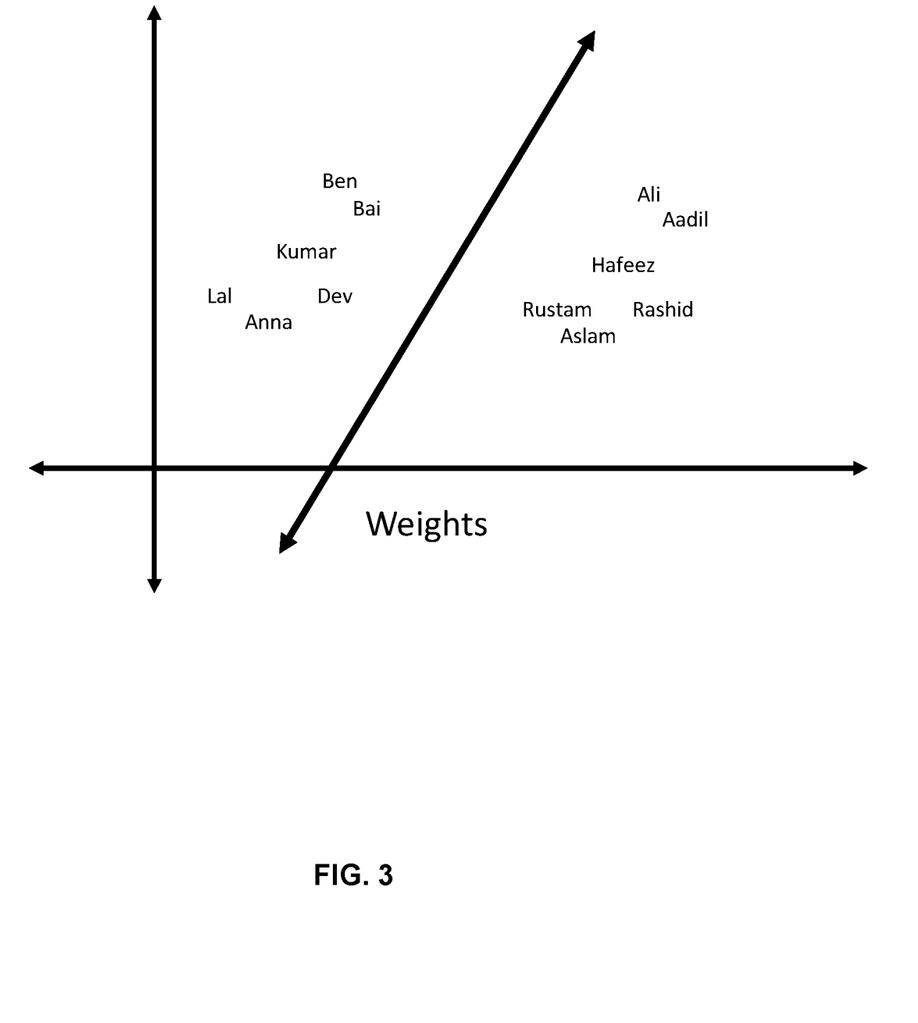
FIG. 3 is an example of clustering names as part of a Support Vector Machine (SVM) algorithm in accordance with the principles of the present disclosure.

Returning to the example of FIG. 1 using the example bifurcation of FIG. 3, records 1A and 1B have a middle name of "Rustam" and "Ali", respectively, as either one or both of those names are on the right side of the plot of FIG. 3, a high dynamic weight is applied to this mismatch (e.g., "−20). However, for records 2A and 2b, the values of "Ben" and "Bai" are on the left-hand side of FIG. 3 and, thus, this mismatch is assigned a low dynamic weight (e.g., "−3"). The result is that the system uses a model, with the additional training used to determine the dynamic weighting, to automatically classify records 1A and 1B as unique while records 2A and 2B are determined to be duplicates. As mentioned above, duplicate records can be automatically removed from the database if desired.

Figure 2B:
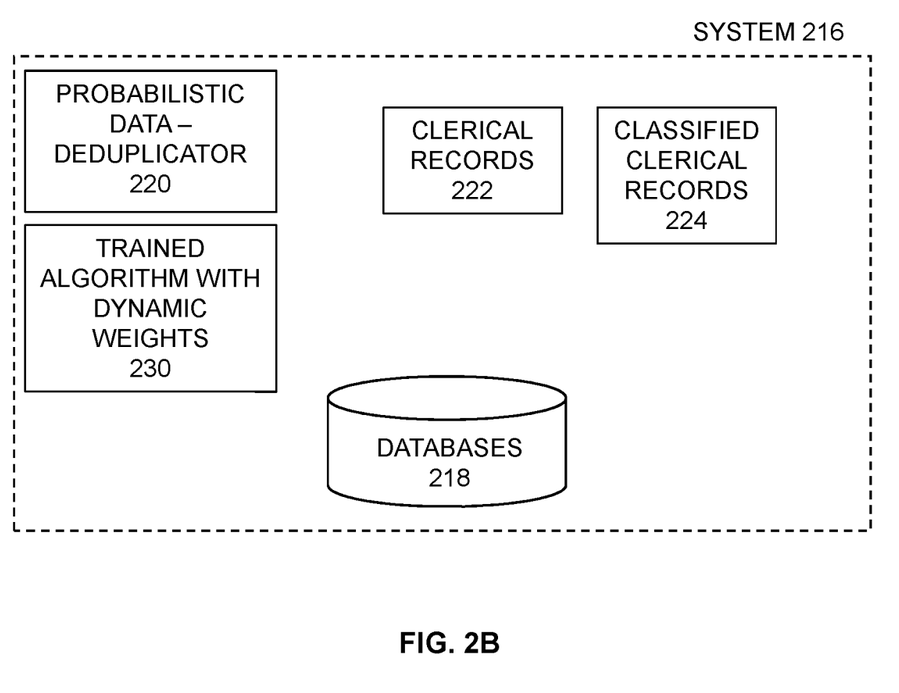
FIG. 2B is a block diagram of a data-deduplication system in accordance with the principles of the present disclosure.

FIG. 2B is a block diagram of a data-deduplication system 216 in accordance with the principles of the present disclosure. As mentioned above, one or more databases 218 or data-stores may have a plurality of records stored therein with each of the records comprising multiple fields or columns. The stored data may include data used to train one or more artificial intelligence systems as other data on which the trained systems are to operate. A probabilistic record classifier system 220 is used to classify a number of records which results in a plurality of records 222 being classified as "clerical". These records 222 can be stored by the system 216 and presented to a user, such as for example a subject matter expert (not shown). The user can manually classify these records 222 to generate a classified set of records 224. In particular, each of the records of the clerical records 222 can be classified as either "unique" or "duplicate". As explained above, the system 216 can apply dynamic weights for one (or more) columns or fields of a record. Based on the content of the record's column (i.e., the data value within that column) a weight value is determined that automatically classifies the record in accordance with how the subject matter expert classified that record. Thus, the trained system having the trained algorithm 230 with the dynamic weighting capability can then be applied to automatically classify new records using dynamic weights for a column.

Figure 4:
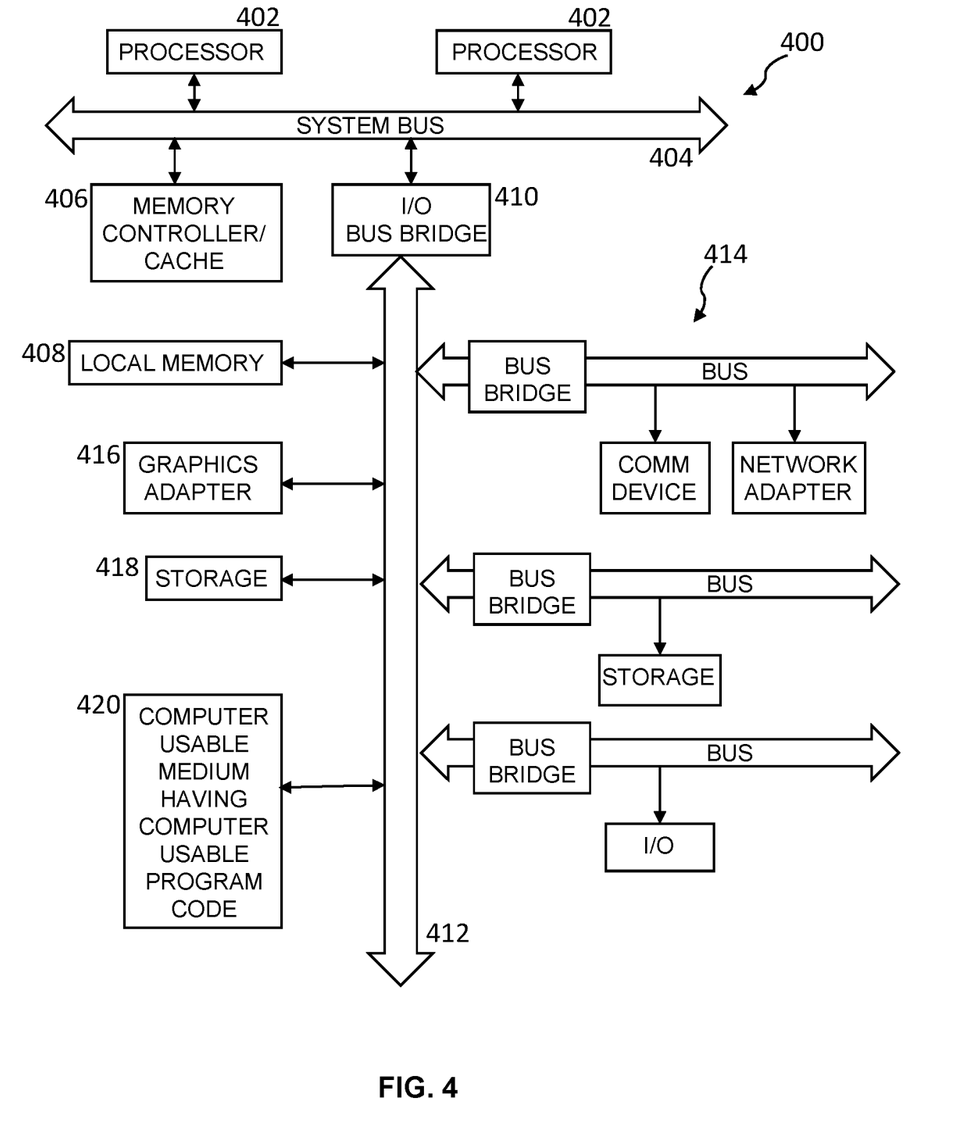
FIG. 4 depicts a block diagram of a data processing system in accordance with the present disclosure.

Referring to FIG. 4, a block diagram of a data processing system is depicted in accordance with the present disclosure. A data processing system 400, such as may be utilized to implement the hardware platform 216 or aspects thereof, e.g., as set out in greater detail in FIGS. 2A and 2B, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more buses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 3. It should be appreciated that the data processing system 400 can be implemented in the form of any system including a processor and memory that is capable of performing the functions and/or operations described within this specification. For example, the data processing system 400 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on. The data processing system 400, such as may also be utilized to implement the data-deduplication system 216, or aspects thereof, e.g., as set out in greater detail in FIG. 2A and FIG. 2B.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be

What is claimed is:

1. A method comprising:
comparing, by a computer, a first record of a data-store with a second record of the data-store, wherein comparing comprises:
   comparing a first value of a first field of the first record with a second value of a second field of the second record and determining a first score indicative of whether or not the first value matches the second value;
   comparing a third value of a third field of the first record with a fourth value of a fourth field of the second record and determining a second score indicative of whether or not the third value matches the fourth value;
dynamically assigning, by the computer, a first weight for the first score to generate a first weighted score, wherein the first weight is based on one or both of the first value or the second value;
assigning, by the computer, a second weight for the second score to generate a second weighted score;
calculating by the computer, a composite score based on the first weighted score and the second weighted score;
determining, by the computer, whether or not the first record and the second record are duplicate records, based on the composite score; and
eliminating from the data-store, based upon a determination that the first record and the second record are duplications records, one of the first record and the second record.

2. The method of claim 1, comprising:
dynamically assigning, by the computer, the second weight, wherein
the second weight is based on one or both of the third value or the fourth value.

3. The method of claim 1, comprising:
receiving, by the computer a plurality of manually classified records along with an indication whether or not each of the manually classified records is a duplicate.

4. The method of claim 3, comprising:
using, by the computer, the manually classified records and a Support Vector Machine (SVM) algorithm to determine the first weight.

5. The method of claim 1, wherein
the data-store comprises a database and the records each comprise a same set of fields.

6. The method of claim 5, wherein
the first field and the second field are a first same field from the set of fields and the third field and the fourth field are a second same field from the set of fields.

7. The method of claim 1, wherein
dynamically assigning the first weight comprises selecting the first weight from a set comprising a higher-value weight and a lower-value weight.

8. The method of claim 1, wherein
dynamically assigning the first weight comprises selecting the first weight from set of potential weights having at least three members.

9. The method of claim 1, wherein
the first score is negative when the first value and second value do not match and is positive when the first value and second value match.

10. The method of claim 1, wherein
the composite score is a sum of the first weighted score and the second weighted score.

11. A system, comprising:

a processor programmed to initiate executable operations comprising:

comparing a first record of a data-store with a second record of the data-store, wherein comparing comprises:

comparing a first value of a first field of the first record with a second value of a second field of the second record and determining a first score indicative of whether or not the first value matches the second value;

comparing a third value of a third field of the first record with a fourth value of a fourth field of the second record and determining a second score indicative of whether or not the third value matches the fourth value;

dynamically assigning a first weight for the first score to generate a first weighted score, wherein the first weight is based on one or both of the first value or the second value;

assigning a second weight for the second score to generate a second weighted score;

calculating a composite score based on the first weighted score and the second weighted score;

determining whether or not the first record and the second record are duplicate records, based on the composite score; and eliminating from the data-store, based upon a determination that the first record and the second record are duplications records, one of the first record and the second record.

12. The system of claim 11, wherein the processor is programmed to initiate executable operations further comprising:

dynamically assigning the second weight, wherein the second weight is based on one or both of the third value or the fourth value.

13. The system of claim 11, wherein the processor is programmed to initiate executable operations further comprising:

receiving, by the computer a plurality of manually classified records along with an indication whether or not each of the manually classified records is a duplicate.

14. The system of claim 13, wherein the processor is programmed to initiate executable operations further comprising:

using the manually classified records and a Support Vector Machine (SVM) algorithm to determine the first weight.

15. The system of claim 11, wherein the data-store comprises a database and the records each comprise a same set of fields.

16. The system of claim 15, wherein the first field and the second field are a first same field from the set of fields and the third field and the fourth field are a second same field from the set of fields.

17. The system of claim 11, wherein dynamically assigning the first weight comprises selecting the first weight from a set comprising a higher-value weight and a lower-value weight.

18. The system of claim 11, wherein dynamically assigning the first weight comprises selecting the first weight from set of potential weights having at least three members.

19. The system of claim 11, wherein the first score is negative when the first value and second value do not match and is positive when the first value and second value match.

20. A computer program product, comprising:

a computer readable storage medium having program code stored thereon, the program code executable by a data processing system to initiate operations including:

comparing, by the data processing system, a first record of a data-store with a second record of the data-store, wherein comparing comprises:

comparing a first value of a first field of the first record with a second value of a second field of the second record and determining a first score indicative of whether or not the first value matches the second value;

comparing a third value of a third field of the first record with a fourth value of a fourth field of the second record and determining a second score indicative of whether or not the third value matches the fourth value;

dynamically assigning, by the data processing system, a first weight for the first score to generate a first weighted score, wherein the first weight is based on one or both of the first value or the second value;

assigning, by the data processing system, a second weight for the second score to generate a second weighted score;

calculating by the data processing system, a composite score based on the first weighted score and the second weighted score;

determining, by the data processing system, whether or not the first record and the second record are duplicate records, based on the composite score; and eliminating from the data-store, based upon a determination that the first record and the second record are duplications records, one of the first record and the second record.

* * * * *